No. 669,834. Patented Mar. 12, 1901.
C. A. HUSSEY.
PRIMARY BATTERY.
(Application filed July 24, 1900.)
(No Model.) 2 Sheets—Sheet 1.

WITNESSES:
J. H. Niles.
G. C. Gibel.

INVENTOR
Charles A. Hussey
BY
ATTORNEYS

No. 669,834. Patented Mar. 12, 1901.
C. A. HUSSEY.
PRIMARY BATTERY.
(Application filed July 24, 1900.)

(No Model.) 2 Sheets—Sheet 2.

WITNESSES:
J. H. Niles.
G. C. Gribel.

INVENTOR
Charles A. Hussey
BY
ATTORNEYS

UNITED STATES PATENT OFFICE.

CHARLES A. HUSSEY, OF NEW YORK, N. Y.

PRIMARY BATTERY.

SPECIFICATION forming part of Letters Patent No. 669,834, dated March 12, 1901.

Application filed July 24, 1900. Serial No. 24,652. (No model.)

*To all whom it may concern:*

Be it known that I, CHARLES A. HUSSEY, a citizen of the United States, residing in the city of New York, in the borough of Manhattan and State of New York, have invented certain new and useful Improvements in Primary Batteries, of which the following is a specification.

This invention relates to an improved primary battery in which the oxidizing agent in the form of a salt can be gradually resupplied as it is used up, so that a battery is obtained that is not liable to polarize, and thereby able to supply a constant current capable of use for telephone-work, electric motors, and in all cases where a constant current is required; and the invention consists of a primary electric battery comprising an exterior jar, a tubular carbon in said jar, a porous cylinder supported in said carbon, an exciting solution in the jar, and an oxidizing salt placed between the carbon and the porous cylinder in such a manner that the products of decomposition can pass off and collect in the lower part of the jar, substantially as hereinafter described.

The invention consists, further, in certain details of construction and combinations of parts, which will be more fully described hereinafter and finally claimed.

Figure 1:
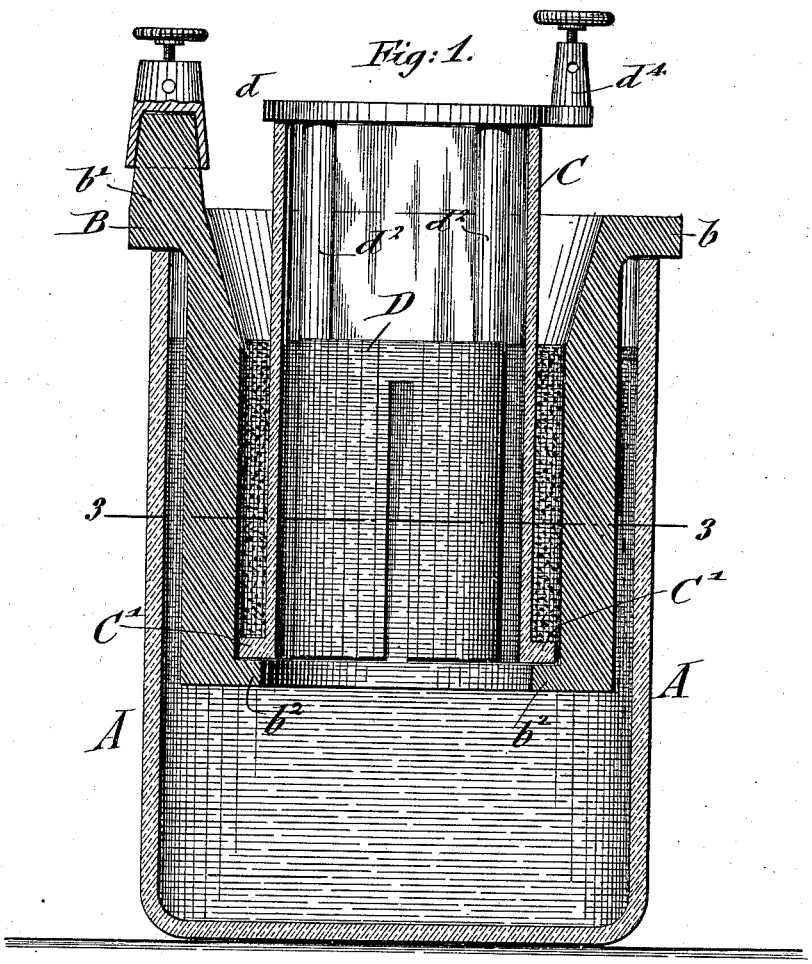
Figure 2:
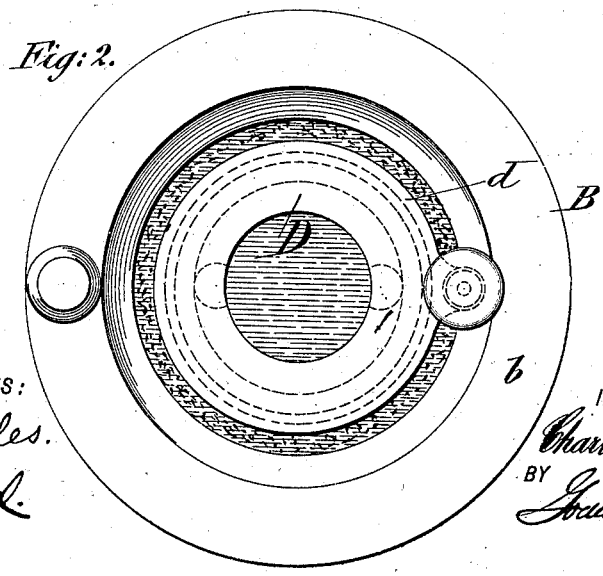
Figure 3:
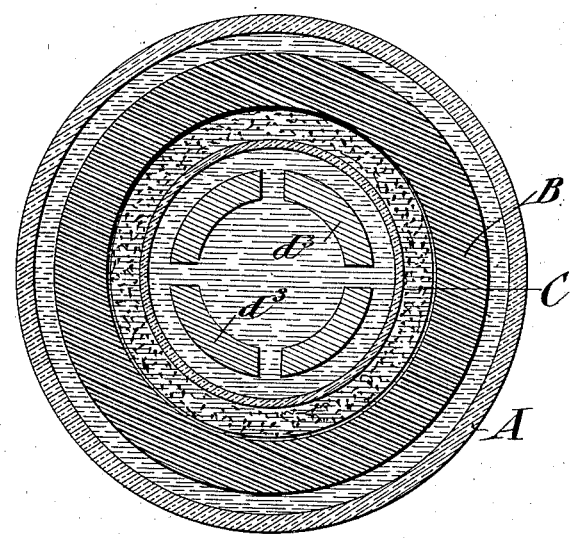
Figure 4:
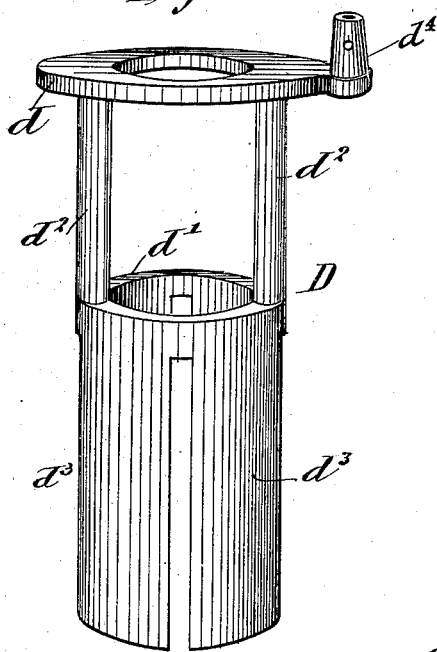

In the accompanying drawings, Figure 1 is a vertical central section of my improved primary battery, and Fig. 2 is a plan view of the same. Figs. 3 and 4 are respectively a section on line 3 3, Fig. 1, and a detail perspective of one of the elements of the cell.

Similar letters of reference indicate corresponding parts.

Referring to the drawings, A represents a jar, made of glass, hard rubber, or any other suitable material and of any suitable size.

B is a tubular carbon, which is provided with a circumferential flange $b$, that rests on the rim of the cell, the upper end of the carbon being made tapering, so as to form a funnel-shaped opening, as shown in Fig. 1. The flange $b$ is provided with a round stud $b'$ and binding-post for making electrical connection with the carbon, said stud being formed integral with the carbon. The lower end of the carbon is provided with an inwardly-projecting flange $b^2$, which is likewise integral with the carbon and molded in one piece with the same and which serves for supporting a porous cylinder C, which is open at both ends and provided at the lower end with an exterior flange $C'$, which flange rests on the interior flange of the carbon B, without, however, forming a liquid-tight joint with the same. In the porous cylinder C is suspended a zinc D of the shape shown in Fig. 3—*i. e.*, consisting of an upper ring $d$ and a lower ring $d'$, which rings are connected by parallel bars or hangers $d^2$, while below the ring $d'$ are arranged downwardly-extending parallel segments $d^3$, as shown in Fig. 3. The zinc is preferably cast in a mold. The object of the special form shown is to secure a large surface for the lower part of the electrode, which is subjected to the action of the exciting solution, while less metal is required for the upper part of the element, which part serves for suspending the lower part and for conveying the current away from the same. A lug $d^4$ for making connection with the circuit is formed upon the zinc D. In place of the shape shown the zinc may be made in any other form by which the same result is attained. Before the battery is assembled the porous cylinder is inserted into the cylindrical carbon, so that the exterior flange at its lower end rests upon the internal flange of the carbon. The annular space between the carbon and cylinder is then filled with an oxidizing salt—such, for example, as mercuric bisulfate. This salt is placed around the porous cylinder up to the flaring portion of the carbon. When this is accomplished, the carbon, with the porous cylinder, is inserted into the cell, which has been partially filled with an exciting solution, such as sulfuric acid diluted with water or a solution of sodium chlorid, (common salt.) By inserting the parts the level of the liquid is caused to rise, and when the parts are in position an additional quantity of the solution may be added, if necessary, to bring the level up to about one and a half inches from the top of the jar. The zinc is then inserted into the porous cylinder until the ring of the same rests on the upper ends of the cylinder, as shown in Fig. 1. The cell is then connected and is ready for action.

As an oxidizing agent it is necessary to employ a salt practically insoluble in the exciting solution, as otherwise it would dissolve without producing the proper oxidizing action. For this purpose mercuric bisulfate (bisulfate of mercury) may be used, or any other suitable chemical. When the circuit is closed, the mercuric bisulfate is decomposed, so as to liberate sulfuric acid, while the oxygen given off unites with the nascent hydrogen liberated from the zinc, so as to form water, metallic mercury being precipitated. The mercury passes between the carbon and porous cylinder at the lower ends of the same and collects in the bottom of the jar A. As by the use of the battery the zinc is consumed, salts of zinc are formed, which are gradually dissolved by the exciting solution, so as to saturate the same. Simultaneously the oxidizing salt is also gradually decomposed and has to be resupplied from time to time. This is accomplished by supplying a quantity of mercuric bisulfate through the funnel-shaped opening in the carbon as the same gradually moves down toward the lower end of the cylinder. By thus charging the oxidizing salt from time to time the battery is capable of supplying a constant current without dismounting the battery, which is objectionable. When the exciting solution becomes gradually saturated with salts of zinc, the zinc can be removed from the porous cylinder (or may remain in position in the same) and the nozzle of a syringe is introduced through the cylinder and the saturated solution withdrawn. Likewise the metallic mercury that collects by gravity at the bottom of the jar is removed from time to time. Water is then supplied to the cylinder, or such other solution is supplied as may be necessary, according to the oxidizing salts employed, inasmuch as the sulfuric acid required for the solution is supplied by the decomposition of the mercuric bisulfate.

My improved electric battery has the following advantages: First, the battery when not required for use has very little local action and maintains its internal resistance and electromotive force substantially unimpaired; second, it is self-feeding, as the oxidizing salt can be resupplied from time to time as required, said salt remaining practically insoluble and unchangeable until it is consumed; third, the battery can be charged and kept in continuous operation without separating the parts and dismounting, and, fourth, the battery is not subject to polarization, inasmuch as the hydrogen is continuously combined with the oxygen liberated by the oxidizing salt.

Having thus described my invention, I claim as new and desire to secure by Letters Patent—

1. A primary electric battery, consisting of an exterior jar, a tubular carbon in said jar, a zinc supported therein, a porous cylinder supported in said carbon, an exciting solution in the jar, and an oxidizing salt placed between the carbon and the porous cylinder in such a manner that the products of decomposition can pass off and collect in the lower part of the jar, substantially as set forth.

2. A primary electric battery, consisting of an exterior jar, a tubular carbon in said jar, a porous cylinder supported in said carbon, a zinc supported in said cylinder, an exciting solution in the jar, and a practically-insoluble oxidizing salt placed in the space between the carbon and porous cylinder, substantially as set forth.

3. A primary electric battery, consisting of an exterior jar, a tubular carbon in said jar provided with an exterior flange, a funnel-shaped upper part, and an interior flange at its lower end, a porous cylinder provided with an exterior flange at its lower part resting on the interior flange of the carbon, a zinc supported in said cylinder, an exciting solution in the jar, and an oxidizing salt placed in the space between the carbon and porous cylinder, substantially as set forth.

4. A primary electric battery, consisting of an exterior jar, a tubular carbon therein provided with an exterior flange, a funnel-shaped upper part and an interior flange at its lower end, a porous cylinder provided with an exterior flange at its lower part resting on the interior flange of the carbon, a zinc supported in said cylinder and composed of two rings, an upper and a lower ring, segmental pieces below the lower ring and hangers connecting the upper and lower rings, an exciting solution in the jar, and an oxidizing salt placed in the space between the carbon and porous cylinder, substantially as set forth.

In testimony that I claim the foregoing as my invention I have signed my name in presence of two subscribing witnesses.

CHARLES A. HUSSEY.

Witnesses:
PAUL GOEPEL,
J. H. NILES.